United States Patent [19]

Gustavsson

[11] 4,449,648
[45] May 22, 1984

[54] MOBILE SPREADER UNIT

[76] Inventor: Kurt Gustavsson, Pilagarden, Fjäras, Sweden, 430 33

[21] Appl. No.: 259,974

[22] Filed: May 4, 1981

[30] Foreign Application Priority Data

Jan. 26, 1979 [SE] Sweden ............................... 7900705

[51] Int. Cl.³ .............................................. A01C 5/00
[52] U.S. Cl. .................................. 222/164; 222/623; 239/661; 414/439
[58] Field of Search ................ 222/623, 164; 239/661; 414/439, 440, 442

[56] References Cited

U.S. PATENT DOCUMENTS 3,065,556 11/1962 Kampert .......................... 222/623 X
4,080,911 3/1978 Gregory et al. ................. 222/623 X

FOREIGN PATENT DOCUMENTS 350995 11/1972 Sweden .

OTHER PUBLICATIONS

*Vagnytt* (Swedish), No. 810 (1978), p. 8.

Primary Examiner—Joseph J. Rolla
Assistant Examiner—Frederick R. Handren
Attorney, Agent, or Firm—Cantor and Lessler

[57] ABSTRACT

A mobile spreader unit comprises a tractor and a detachable hopper. The latter is defined by tapering front and rear walls and has a breadth permitting it to fit in between the rear wheels of the tractor. There is an elongate spreader opening in the bottom of the hopper, and an agitator adjacent to the mechanism driven by a roller to be brought into contact with one of the rear wheels of the tractor. Pivots at the front wall of the hopper are attachable to brackets at the tractor, and are located so the point of gravity of the hopper tends to tilt it away from the tractor. In its furthermost tilted position the rear wall will be substantially parallel to the ground, and the hopper may then be used to scoop up particulate material to be spread. A pressure fluid actuator raises the hopper to an upright position, in which finally the roller contacts the rear wheel of the tractor and drives the agitator.

1 Claim, 2 Drawing Figures

MOBILE SPREADER UNIT

BACKGROUND OF THE INVENTION

Mobile spreader units, such as are used for sanding roads in wintertime, or for distributing fertilizers, comprise a tractor and a hopper having suitable distribution means. The total time needed for spreading operations is not long, taken over the length of the year, and the hopper is therefore detachable so the tractor may be used for other purposes also.

One desirable feature is that the hopper shall be tiltable, so it can, by itself, scoop up the matter to be spread, much as sand. To that end the hopper is often mounted at the front of the tractor, but that will increase the length of the vehicle and reduces the manoeverability thereof and will also block the driver's range of vision forwardly/downwardly.

No suitable arrangement for mounting a spreading hopper upon a tractor has, however, been proposed.

SUMMARY OF THE INVENTION

The aim of the present invention is to propose a mobile spreader unit comprising a tractor and a detachable hopper for mounting between the rear wheels of the tractor.

The hopper has front, rear and side walls, and its breadth permits the hopper, in use, to fit in between the big, spaced apart rear wheels of the tractor. The front and rear walls taper downwardly towards an elongate spreader opening, and agitator means is provided adjacent to said opening and includes a roller mounted at one of the side walls adjacent to the front wall, and adapted to be brought into contact with one of the big rear wheels. Pivot means at the front wall are provided for attachment to the brackets, and are located so the point of gravity of the hopper tends to tilt the hopper away from the tractor until the rear wall occupies a substantially horizontal position close by the ground. A pressure fluid actuator connects the hopper with the tractor and can raise the hopper from a position where the rear wall occupies a substantially horizontal position, to an upright position where the agitator driving roller contacts one of the tractor rear wheels.

The distance between the front and the rear walls of the hopper, at the level of the pivot means, corresponds to about the distance between the ground and the supporting brackets of a conventional agricultural tractor.

DESCRIPTION OF A PREFERRED EMBODIMENT

Figure 1:
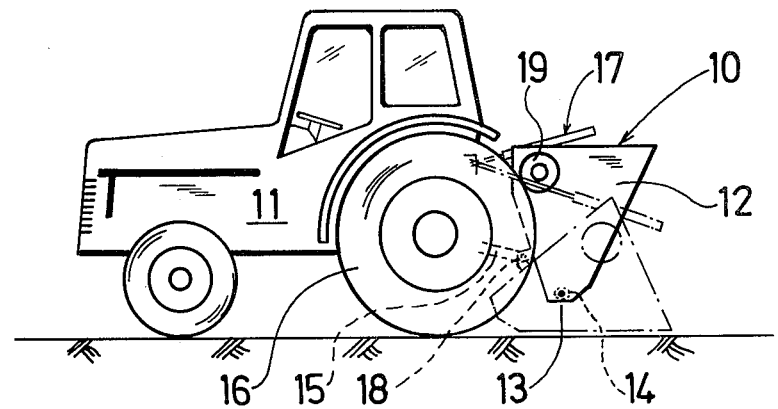
FIG. 1 shows an elevation of a tractor having a spreader device mounted, indicating the position of the hopper in spreading position and in scooping position.

A spreader device 10, suited for spraying sand on roads during wintertime is hung at the rear of a tractor 11, as is shown in FIG. 1. The device 10 includes a tiltable hopper 12 having an elongate feeding opening 13 in its bottom, and an agitator 14 adjacent to the opening. The hopper is designed, in use, to be mounted upon brackets 15 extending rearwardly from the tractor, and has a breadth permitting it to fit in its between the big rear wheels 16 of the tractor. The hopper is retained in working position by a pressure fluid actuator 17, which can "pull" the hopper upright from the filling position indicated in broken lines in FIG. 1, where the rear wall of the hopper is about parallel to the ground. The hopper tilts about pivots 18 and may in the position indicated be used to scoop up the material to be spread, sand, salt or the like. The actuator 17 will also serve for switching a roller 19 into and out of frictional contact with one of the rear wheels 16 of the tractor. The roller 19 forms part of a driving mechanism operating the agitator 14. An automatic tilting of the hopper away from the tractor is ensured by the location of the pivots 18 in relation to the point of gravity of the hopper. When the effluent from actuator 17 is open a dampened folding down movement of the hopper will occur.

The operational functions of the embodiment described above, i.e. loading and spreading, may be directed by the driver from his seat in the cabin. The location of the hopper between the rear wheels will mean an extra load upon the rear wheels, which is especially important in wintertime, while simultaneously the front of the tractor is free for the mounting of a snowplow, a scraper blade or a bucket loader, which may be useful for clearing snow.

Figure 2:
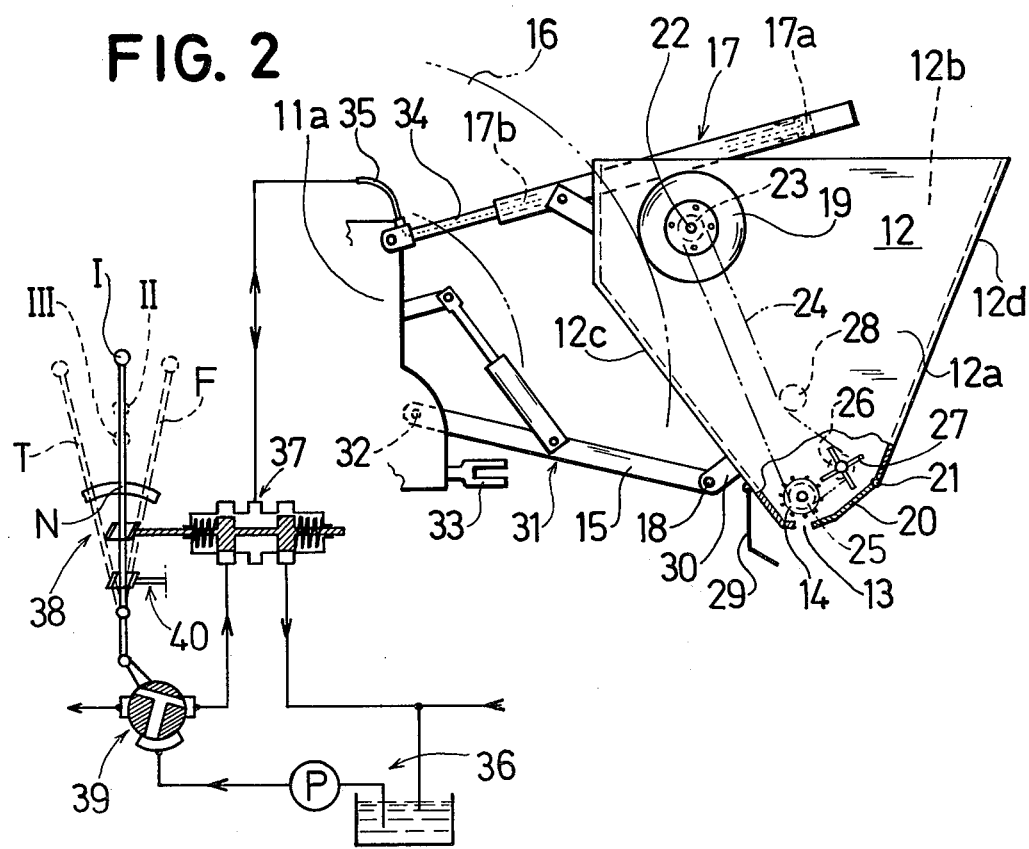
FIG. 2 shows, on a larger scale, the means for mounting and operating the hopper.

The hopper 12 is preferably designed as shown in FIG. 2, and has two parallel side walls 12a and 12b, a front wall 12c turned towards the tractor and being inclined downwardly/inwardly, and a rear wall 12d, likewise inclined downwardly/inwardly. The latter wall is continued by a bottom portion 20, which reaches to the feed opening 13 extending between the side walls. The bottom portion 20 may be swingable about a transverse axis 21, or may be slidable in relation to the rear wall 12d (not shown) in order to determine the breadth of the feed opening.

The shaft 22 of the driving roller 19 is journalled in the upper part of side wall 12a, adjacent to the front wall 12c, so the roller may be brought into contact with one of the rear wheels 16. The shaft runs in a tubular member (not shown) through the hopper 12, to the opposite side wall 12b, where it is also journalled, and carries a gear wheel 23 outside last mentioned side wall. An endless chain 24 runs along this side wall over further gear wheels 25 and 26, which drive the agitator 14 as well as a stirrer 27. The chain transmission includes a conventional chain stretcher 28, and will obtain a suitable elasticity due to the length of shaft 22. A protecting plate 29 prevents snow from entering and blocking the feed opening 13.

The agitator 14 partly operates in the feed opening 13, and distributes the material to be spread along the length of the opening. The stirrer 27 is mounted so as almost to touch the agitator and the bottom portion 20. The arrangement ensures a continuous supply to the agitator, and prevents the formation of bridges around the latter. It will also crush possible lumps and will together with the tapering shape of the hopper cause a complete emptying.

Mountings 30 for the pivots 18 carrying the hopper are preferably arranged to be connected to the conventional tool mounting forks 31, which are provided at most agricultural tractors. The forks, or brackets are swingable about pivots 32 (schematically denoted in FIG. 2) by means of a hydraulic actuator. The height of the hopper in relation to the ground can thus be adjusted by means of the forks 31, which makes it possible to adjust the level and the inclination of the hopper during a scooping up operation. It will not be necessary to dismount the hopper for an occasional towing of some implement, only to lift the hopper so the towing attachment 33 of the tractor becomes accessible.

The mountings 30 are preferably located where the front wall 12c is bent inwards to form part of the bottom structure. The breadth of the hopper, level with these mountings, will be about the same as, or possibly somewhat less than the distance between the ground and the pivots 18 at the distal end of a fork 31, when the latter has been brought to its lowermost position, which is favourable with respect to the scooping operation. The point of gravity of the hopper will be located outside the pivot 18, so the hopper tends to tilt away from the tractor.

The actuator 17 comprises a piston 17a operating in a cylinder 17b, which is pivotably attached to the hopper 12 in such a manner that a considerable portion of its length extends over the hopper. The piston rod is pivotably attached to the tractor chassis 11a. This arrangement permits the fitting of the spreader attachment to tractors of various designs in spite of the considerable length of stroke required to perform the scooping operation indicated in FIG. 1. The actuator is single acting, and is supplied with pressure fluid through a passage 34 in the piston rod. A short connecting hose 35, which runs no risk of being damaged during tilting manoevers, connects the actuator with a suitable source of pressure fluid supply, The supply source preferably is the standard hydraulic equipment 36 of the tractor, and governing occurs by means of a valve 37, which is operated by a "one-hand" lever 38. From the spreading position shown in FIG. 2, the roller 19 may be disengaged by the lever 38 being occasionally brought to position F (free). If the lever is retained in that position the hopper will tilt outwards about pivots 18, due to its own weight, until the lever is brought back to neutral position, N, or the hopper attains scooping-up position, indicated in broken lines in FIG. 1. When the lever is brought to position T (to) pressure fluid will be supplied to the actuator, and the hopper will be "pulled" back to its vertical position. The actuator as well as its attachments will be subjected to considerable stresses when lifting the filled hopper, and a pulling device is to be preferred.

FIG. 2 also includes a three-way valve 39, fitted between the pressure fluid supply 36 and valve 37. Valve 39 may be brought into either of three positions by means of lever 38, as is indicated in FIG. 2, and permits some other fluid actuated tool, for instance a snow-plow, to be used simultaneously with the spreader. Position I (shown) corresponds to operation of the spreader alone, and position II the switching in of the other tool, which will be governed by a link arm 40 actuated by the lever 38, the spreader being brought into action when the tool—the snow-plow—is being lowered to scraping position. Position III means operation of the tool alone.

What I claim is:

1. A mobile spreader unit, comprising a tractor having front wheels, big, spaced apart rear wheels and tool supporting brackets between said big rear wheels and inside the perimeter thereof, as well as a detachable hopper for optional connection to said brackets, said hopper being defined by front, rear and side walls, the breadth between said side walls permitting the hopper, in use, to fit in between said big, spaced apart rear wheels, and said front and rear walls tapering downwardly towards an elongate spreader opening, agitator means in said hopper adjacent to said opening and driving means for said agitator means, including a roller mounted at one of said side walls adjacent to said front wall, and adapted to be brought into contact with one of said big rear wheels, pivot means at said front wall adjacent to said spreader opening for attachment to said brackets and located so the point of gravity of said hopper tends to tilt the hopper away from the tractor when the hopper is mounted on said brackets, said pivot means permitting a tilting movement of the hopper until said rear wall occupies a substantially horizontal position, the distance between said front and said rear walls at the level of said pivot means corresponding to about the distance between the ground and said pivot means, said supporting brackets defining lower struts connected at one end to lower attachment points of said tractor and at the other end to said pivot means, and pressure fluid actuated means, connecting the upper portion of said front wall with an upper attachment point of said tractor for raising said hopper from a position where said rear wall occupies a substantially horizontal position, to an upright position where said agitator driving roller contacts one of said big tractor rear wheels, said pressure fluid actuator means defining an upper strut and comprising a hydraulic cylinder assembly having a fixed piston connected to said tractor at said upper attachment point and a moveable cylinder attached, intermediate the ends thereof, to said upper portion of said front wall.

* * * * *